United States Patent
Schrattenecker

(10) Patent No.: US 7,082,742 B2
(45) Date of Patent: Aug. 1, 2006

(54) CUTTING UNIT FOR A HARVESTER-THRESHER

(76) Inventor: Franz Schrattenecker, Edenaichet 21, Eggerding (AT) A 4773

( * ) Notice: Subject to any disclaimer, the term of this patent is extended or adjusted under 35 U.S.C. 154(b) by 0 days.

(21) Appl. No.: 10/498,471

(22) PCT Filed: Dec. 11, 2001

(86) PCT No.: PCT/AT01/00393

§ 371 (c)(1),
(2), (4) Date: Feb. 2, 2005

(87) PCT Pub. No.: WO03/049532

PCT Pub. Date: Jun. 19, 2003

(65) Prior Publication Data

US 2005/0115217 A1    Jun. 2, 2005

(51) Int. Cl.
*A01D 67/00* (2006.01)
(52) U.S. Cl. ....................................... 56/208
(58) Field of Classification Search ............ 56/122, 56/123, 125, 126, 153, 192, 208, 210, 219
See application file for complete search history.

(56) References Cited

U.S. PATENT DOCUMENTS

| | | | |
|---|---|---|---|
| 4,011,709 A | 3/1977 | Mott et al. | |
| 5,711,140 A * | 1/1998 | Burmann | 56/208 |
| 5,867,972 A * | 2/1999 | Laumann et al. | 56/126 |
| 6,865,871 B1 * | 3/2005 | Patterson et al. | 56/181 |
| 2002/0144492 A1 * | 10/2002 | Calmer | 56/13.9 |

FOREIGN PATENT DOCUMENTS

| | | |
|---|---|---|
| DE | 34 07 812 | 10/1984 |
| DE | 195 08 887 | 1/1999 |

* cited by examiner

*Primary Examiner*—Árpád Fábián Kovács
(74) *Attorney, Agent, or Firm*—Collard & Roe, P.C.

(57) ABSTRACT

A cutter mechanism (1) for a combine-harvester comprises a frame (2) forming a trough (6) from a rear wall (3), two side walls (4) and a floor (5) used as a cutting table, which frame (2) receives an adjustably inserted cutter bar (7) on the input side of the trough, connecting points for holding outer dividers (9), side cutters (10) or the like in the end regions of the cutter bar or side walls (4), a reel (12) of the reaper which is displaceable via actuating drives (11) above the cutter bar (7), and a feed screw (15) which is situated within the trough (6), with the floor (5) being transversally divided and being composed of a rear floor part (16) fixed to the frame for the purpose of adjusting the cutting table length to the respective reaping conditions and of a front floor part (17) which is guided in a slide-adjustable manner relative to the frame in the direction of the travel, and with both floor parts overlapping each other along the path of displacement.

In order to achieve a simple and reliable construction, the front floor part (17) is insertable underneath the rear floor part (16) when shortening the cutting table and a stripper (21) which projects from the front edge (20) of the rear floor part (16) is provided as a transition between the two floor parts (16, 17).

2 Claims, 6 Drawing Sheets

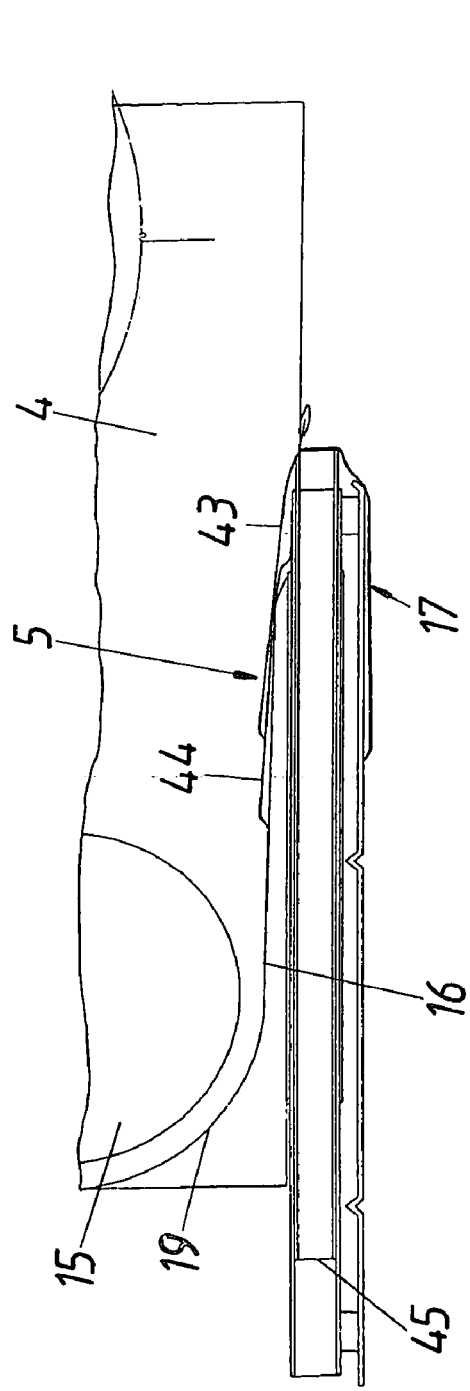
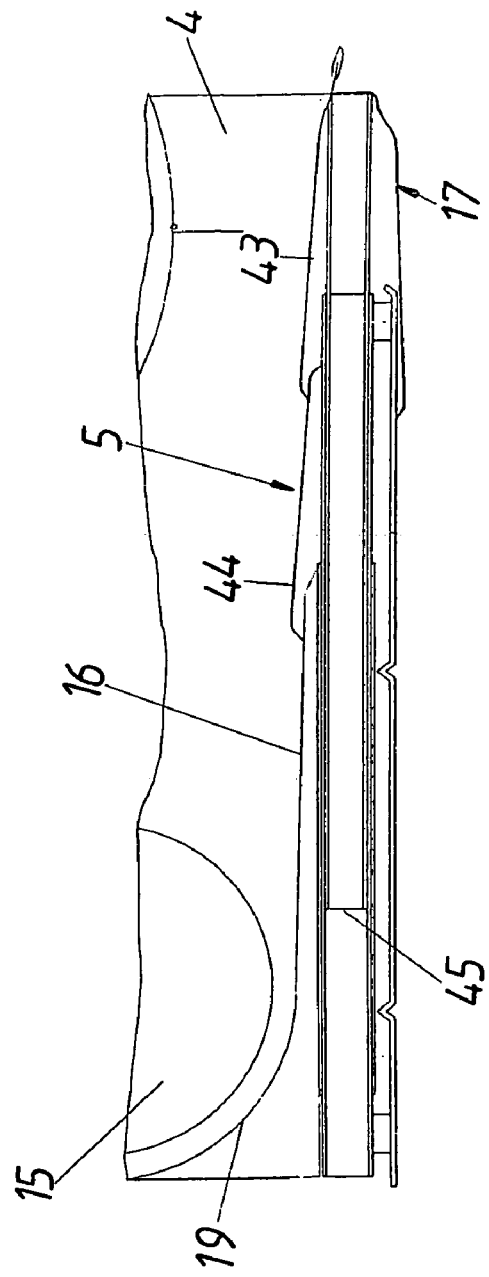

CUTTING UNIT FOR A HARVESTER-THRESHER

CROSS REFERENCE TO RELATED APPLICATIONS

Applicant claims priority under 35 U.S.C. §365 of PCT/AT01/00393 filed on Dec. 11, 2001. The international application under PCT article 21(2) was not published in English.

1. Field of the Invention

The invention relates to a cutter mechanism for a combine-harvester with a frame forming a trough from a rear wall, two side walls and a floor used as a cutting table, which frame receives an adjustably inserted cutter bar on the input side of the trough, connecting points for outer dividers, side cutters or the like in the end regions of the cutter bar or side walls, a reel of the reaper which is displaceable via actuating drives above the cutter bar, and a feed screw which is situated within the trough and is situated upstream of the pass-through opening of the rear wall, with the floor being transversally divided and being composed of a rear floor part fixed to the frame and of a front floor part which is guided in a slide-adjustable manner relative to the frame in the direction of the travel, and with both floor parts overlapping each other along the path of displacement.

2. Description of the Prior Art

A fine-tuned cutter mechanism is the precondition for proper combine operation. It is necessary to coordinate the cutter bar, reel of the reaper and feed screw with respect to their output and the respective material to be harvested in order to achieve the required smooth cooperation during the reaping and an orderly intake of the reaped material. An additional decisive factor for the cutter mechanism operation is the position of the cutter bar depending on the stem length of the material to be reaped relative to the feed screw and the reel of the reaper, since in the case of a deficient mutual allocation of cutter bar, reel and feed screw there is a likelihood of intake malfunctions, blockages and formations of accumulations, leading to considerable losses in threshed material.

For the purpose of suitable adjustment of the cutter mechanism to different materials to be reaped, most reels can be adjusted in their position relative to the feed screw. Moreover, the length of the cutting tables which are formed by the floor of the cutter mechanism trough can be changed according to the respective reaping conditions. As is shown in DE 34 07 812 A, DE 195 04 244 C or DE 195 08 887 C for example, the floor is transversally divided for this purpose into a rear floor part fixed to the frame and a front floor part which is slidingly adjustable in the direction of travel, with the front floor part which carries the cutter bar being adjustable by way of suitable actuating drives and the floor plate of the front floor part grasping over the upper side of the floor plate joined to the rear floor part. Since the rear floor part forms a trough receiving the feed screw, the adjusting path of the front floor part is limited within a narrow margin when the cutting table is shortened as a result of the curvature of the trough, so that in total there is only a comparatively limited adjusting path for the cutting table. Any extension of the cutting table beyond this relatively short actuating path requires that the front floor part is advanced to a respectively high extent after unlatching and the thus opened intermediate space between the front and rear floor part is bridged with a separate intermediate floor plate. Despite the unsatisfactory possibilities for adjustment, the known cutter mechanisms are relatively complex in their configuration and production and entail relatively high production costs.

SUMMARY OF THE INVENTION

The invention is therefore base on the object of providing a cutter mechanism of the kind mentioned above which is characterized by its reliable, far-reaching adjustability at low and cost-effective production expenditure.

The invention achieves this object in such a way that the front floor part is insertable underneath the rear floor part when shortening the cutting table and that a stripper which projects from the front edge of the rear floor part is provided as a transition between the two floor parts or that the front floor part comprises at least two mutually overlapping floor sections which are guided relative to each by means of telescopic guide tubes or in a slide-adjustable way relative to the rear floor part.

By sliding the front floor part beneath the rear floor part in order to shorten the cutting table length, an impairment of the adjusting path by the trough of the rear floor part is prevented in an especially simple and elegant manner right from the start, which substantially enables the utilization of the entire length of the rear floor part as an adjustment path for the front floor part. A stripper projecting from the rear floor part is used as a transition between the two floor parts and ensures a smooth intake of the reaped material.

Another proposed solution for ensuring a sufficiently larger adjusting range is obtained by dividing the front floor part into mutually overlapping floor sections which can be pushed together or pulled apart by way of telescopic guide tubes according to the summed regions of overlapped, so that a comparatively large adjusting range can be covered without any additional intermediate floor.

If guide rails for guiding the front floor part are arranged on the lower sides of the side walls projecting beyond the rear floor part, it is possible to achieve a smooth displacement motion of the floor for the cutting table adjustment and thus to simultaneously stiffen the entire trough construction.

It is further advantageous if supporting arms are supported on the frame or rear floor part, which supporting arms are evenly distributed over the width of the floor, project beyond the rear floor part and engage in supporting profiles of the front component. Such supporting arms not only lead to an additional guidance of the front floor part, but also reduce the likelihood of a deflection of the floor part, even when the floor part is made in lightweight construction for example.

For the purpose of adjusting the cutter mechanism to the different materials to be reaped it is necessary to change the reel position depending on the cutting table length. In order to achieve the simplest possible adjustment of the position, the side walls form an upper guide edge parallel to the floor in the adjusting region of the front floor part and are connected with the front floor part of the guide edge along displaceable control cams, with a control roll for adjusting the position of the reel cooperating with said guide edges or with said control cams, which control roll is arranged on a pivoting arm for the bearing of the reel. This reel control allows an automatic adjustment of the reel position to the cutter bar position or cutting table length in a simple mechanical way because the control rolls with the pivoting arms receiving the reel will rest on the guide edges for such a time and will hold the pivoting arms in the assumed current position until an adjusting movement of the front floor part will displace the control cams in the region of the control rolls and the control rolls rolling off along the control path of the control cams are lifted and lowered again more or less relative to the guide edges, as a result of which the reel position is also simultaneously and consequently determined.

According to an especially advantageous embodiment of the invention, connecting points for side cutters are provided on the intake end of the side walls in the region of the lower edge, which side cutters are held in the connection points in a manner so as to be pivot-adjustable about an axis parallel to the cutter bar and are in connection with the side walls by means of intermediate plates which are arranged in a fan-like manner and are supported in a pivoting way coaxially to the side cutter, with the upwardly pivoted side cutters being supportable by means of a securing bar relative to the side walls. A combination of cutter bar and side cutters is obtained. The side cutters can be brought effortlessly from a downward idle position to a cutting position and can be fixed in this cutting position by latching with a securing rod. The intermediate plates which are co-pivoted with the side cutters lead to a stiffening of the cutter mechanism and in the end ensure a smooth intake of reaped material.

BRIEF DESCRIPTION OF THE DRAWINGS

The subject matter of the invention is shown in the drawings as examples by reference to functional diagrams, wherein:

FIGS. 6 and 7 show the floor region of a slightly altered embodiment of the cutter mechanism in a side view.

Figure 1:
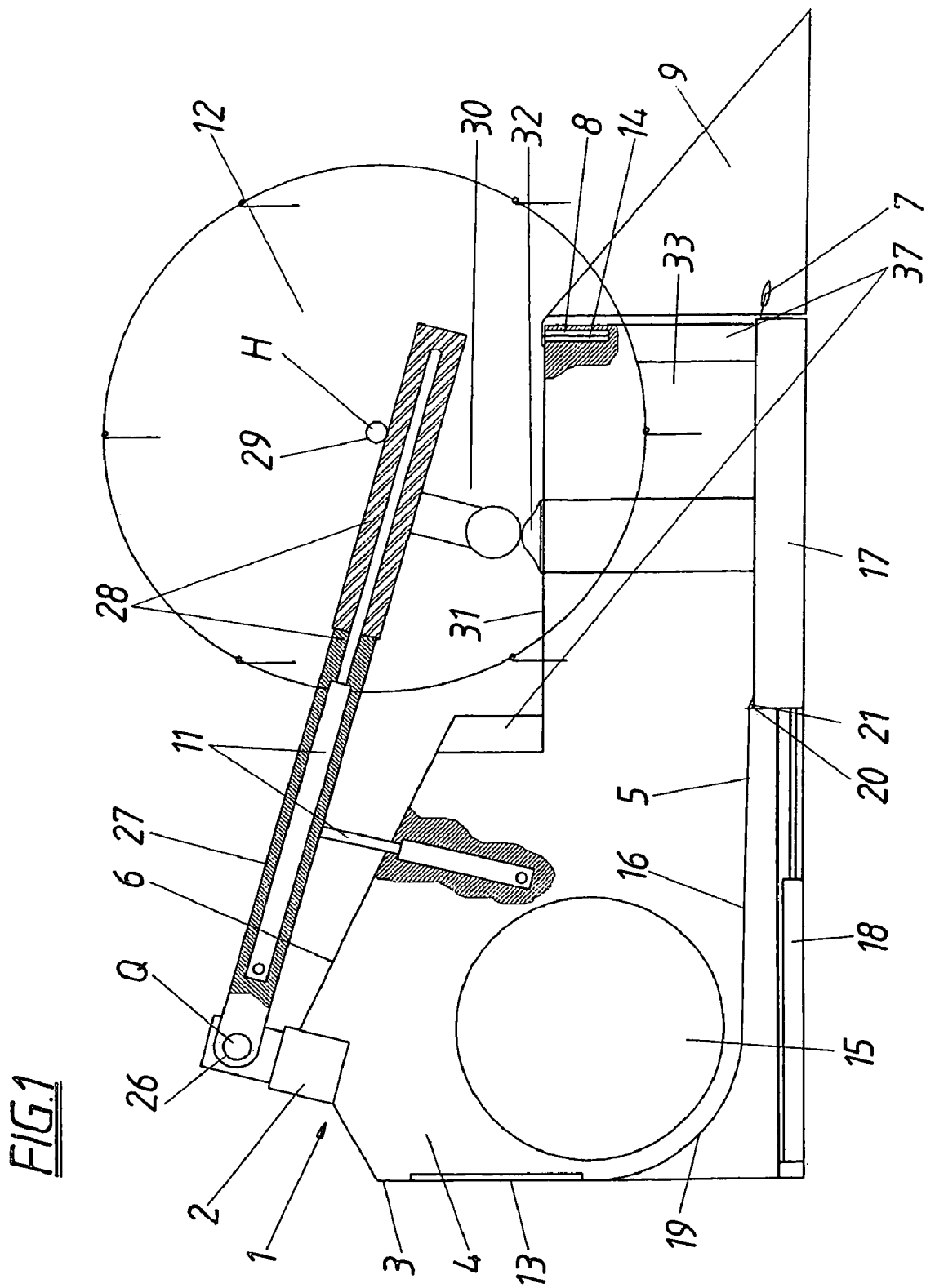
FIGS. 1 and 2 show a cutter mechanism in accordance with the invention in a side and front view.
Figure 2:
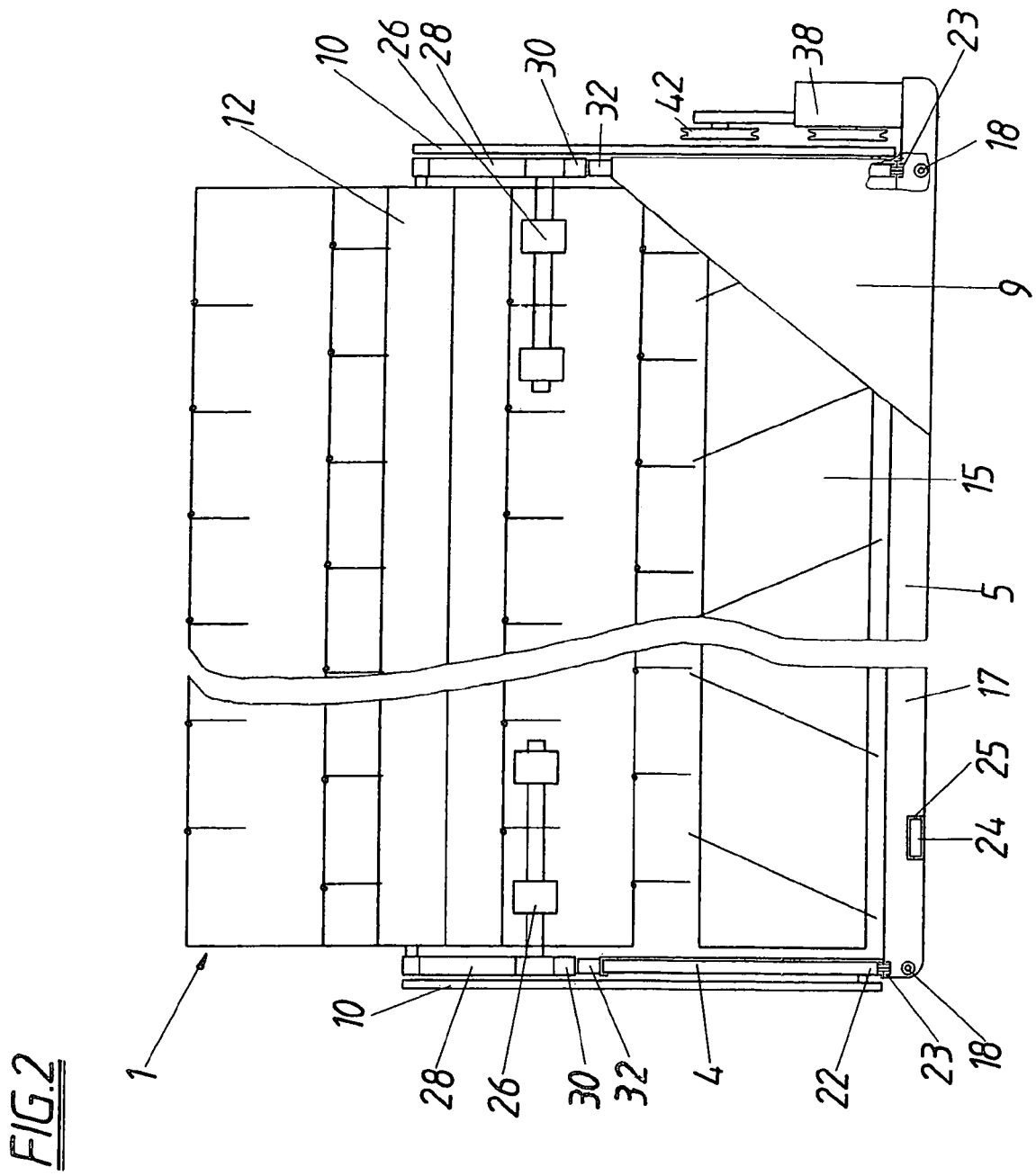

A cutter mechanism 1 for a combine-harvester (not shown in closer detail) comprises a frame 2 which forms a trough 6 with a rear wall 3, two sides walls 4 and a floor 5 used as a cutting table and which receives an adjustably inserted cutter bar 7 on the input side of the trough 6, connecting points 8 with vertical bearing pins 14 for holding for outer dividers 9, side cutters 10 or the like in the front end region side walls 4, a reel 12 of the reaper which is displaceable via actuating drivers 11 above the cutter bar 7, and a feed screw 15 which is situated within the trough 6 and is situated upstream of the pass-through opening 13 of the rear wall 3. In order to enable the adjustment of the position of the cutter bar 7 depending on the stem lengths of the respective material to be reaped to the position of the feed screw 15 and the reel 12, the floor 5 is transversally divided and is composed of rear floor part 16 which is fixed to the frame and a front floor part 17 which is in a slide-adjustable way in the driving direction relative to the frame 2, so that a sliding displacement of the front floor part 17 will change the length of the cutting table and thus also the position of the cutter bar 7 arranged on the front floor part 17. This change in the length of the floor 5 and the adjustability of the reel length in the longitudinal direction of height and floor then allow the adjustment of the cutter mechanism 1 to the material to be reaped. The outer dividers 9 can be linked easily with the connection points 8 and can be adjusted with one move from the functional position (FIG. 1) to a transport position (FIG. 2) due to their pivoting capability. If necessary, they can be removed entirely (left side of FIG. 2).

For the purpose of adjusting the rear and front floor parts 16, 17, hydraulic cylinders 18 are provided in the region of the rear floor part 16 which extend in the driving direction and with which the front floor part 17 can be displaced relative to the rear floor part 16. The front floor part 17 is withdrawn underneath the rear floor part 16 during the shortening of the cutting table, as a result of which the adjusting region is not subjected to any impairments by the trough 19 for the feed screw 15 formed by the rear floor part 16 on the upper side. A stripper 21 which projects forward from the front edge 20 of the rear floor part 16 is used as a transition between the rear and the front floor part 16, 17, as a result of which a smooth intake of the reaped material is ensured.

For the purpose of the smooth guidance of the front floor part 17, guide rails 23 are arranged on the lower sides 22 of the side walls 4 projecting beyond the rear floor part 16, in which guide parts the front floor part 17 is guided along the entire adjustment path. A receiving means for the hydraulic cylinders 18 are prepared below the guide rails 23 in the floor part 17, thus preventing any major offset between the guide rails 23 and the hydraulic cylinders 18 as well as any clamping danger or the like.

In order to stiffen the front floor part 17 and for avoiding an excessive deflection of this floor part, supporting arms 24 projecting beyond the rear floor part 16 rest on the frame 2 and on the rear floor part 16, which supporting arms 24 engage in associated supporting profiles 25 of the front floor part 17.

For the purpose of bearing the reel, bearing points 26 are provided on the frame 2 for pivoting arms 27 which are swivelably linked relative to the reel axis H which is parallel to the transversal axes Q, which pivoting arms can be actuated via the actuating drives 11 with respect to a pivoting adjustment or a telescopic displacement in length. The bearing 29 of the reel 12 is situated at the front part 28 of the pivoting arms 27, with said front part 28 also having a downwardly projecting control roll 30. In order to achieve a simple, mechanical limitation of the adjusting movement of the reel 12, the side walls 4 form in the adjusting region of the front floor part an upper guide edge 31 which is parallel to the floor and which is displaceable along control cams 32 connected to the front floor part 17, so that depending on the adjusting path of the front floor part the control roll 30 will cooperate either with the guide edge 31 or with the control cam 32 and the reel position is either lifted or maintained. The optimal reel height which is predetermined close to the cutting bar by the control cams 32 can be determined and any falling below this reel height can be prevented.

Figure 3:
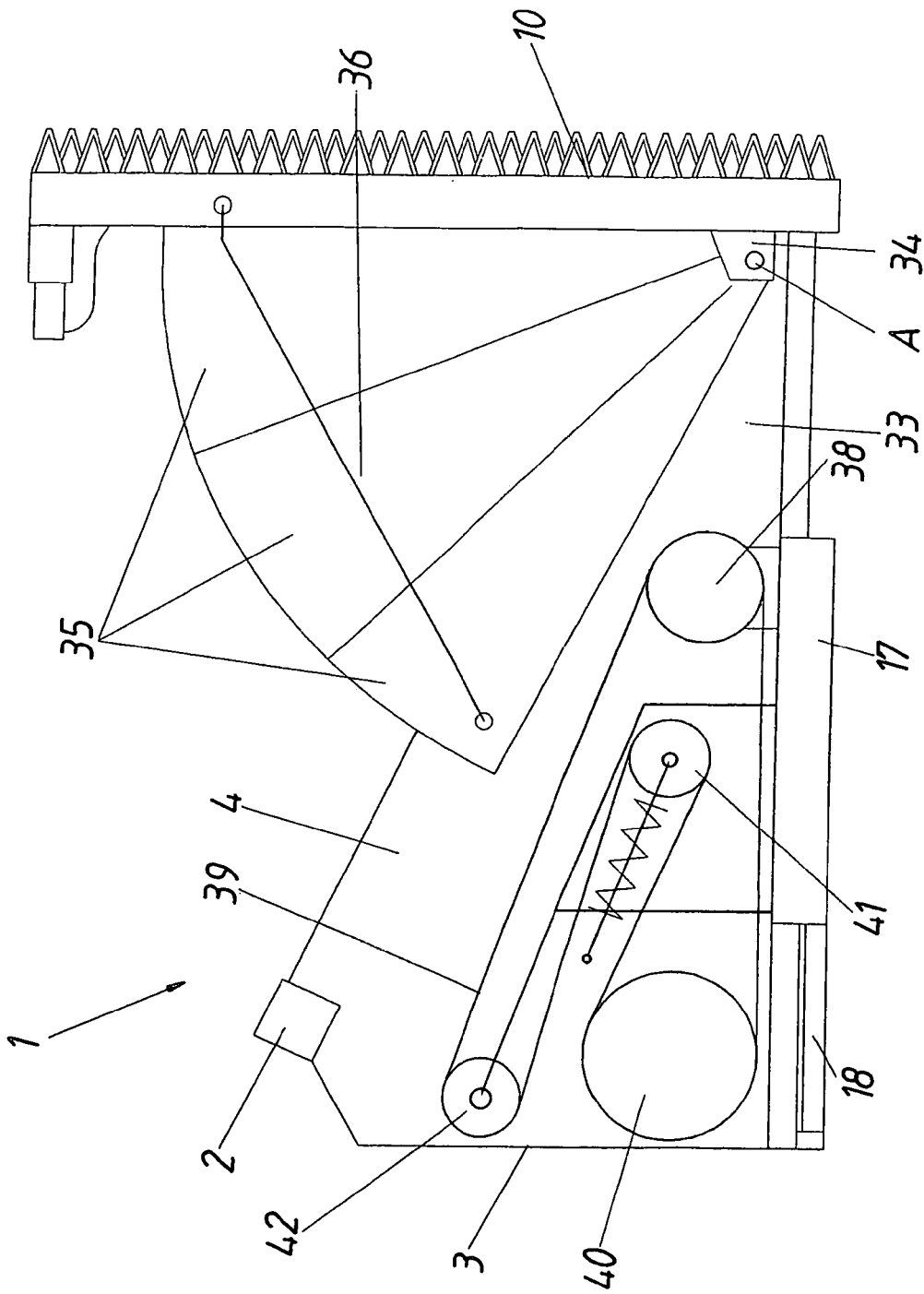
FIGS. 3, 4 and 5 show a part of this cutter mechanism with side cutters and a blade drive in a side view with retracted and extended floor and with side cutters pivoted upwardly in the cutting position and with side cutters pivoted downwardly in the idle position, and with extended floor.
Figure 4:
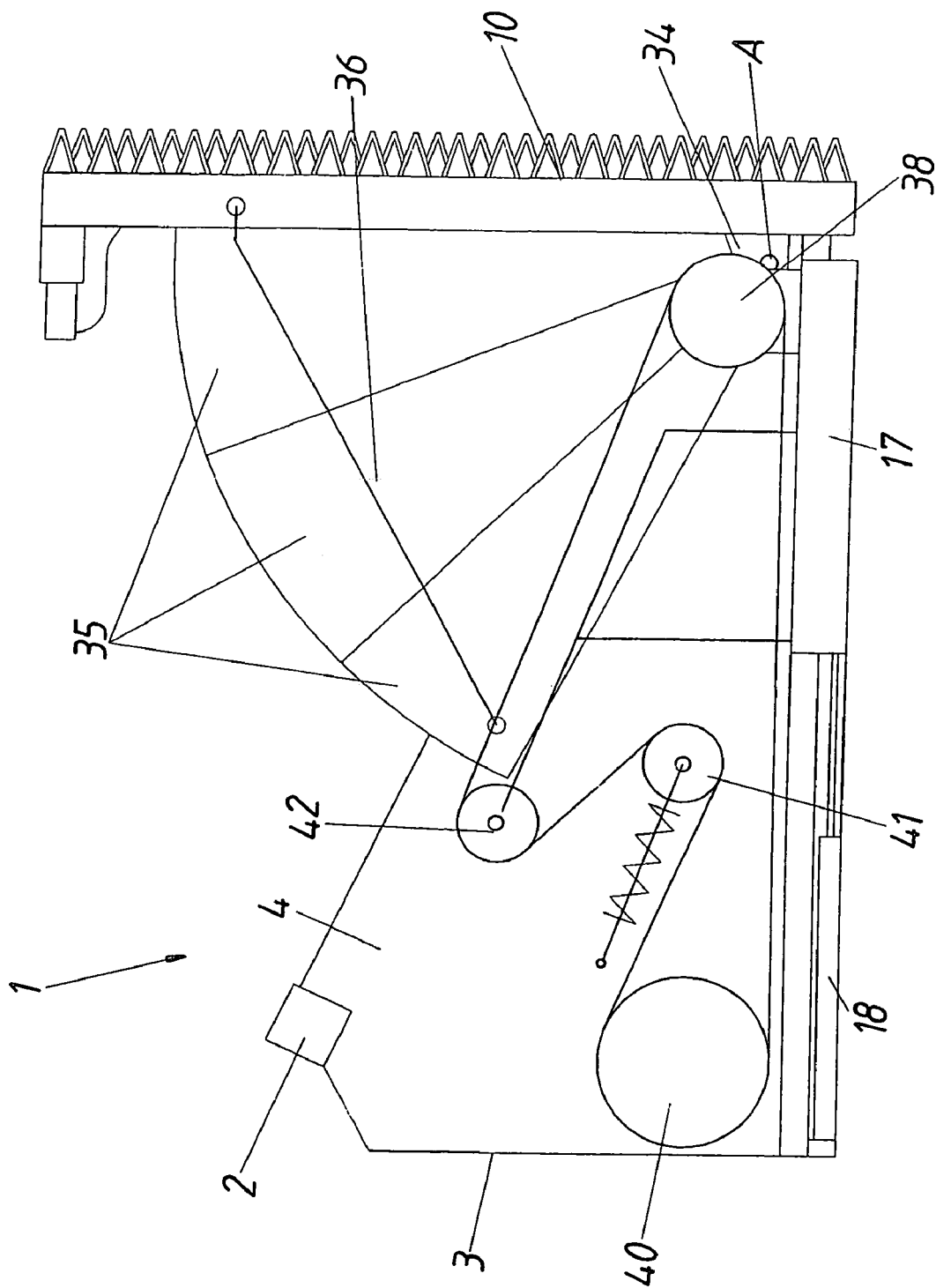
Figure 5:
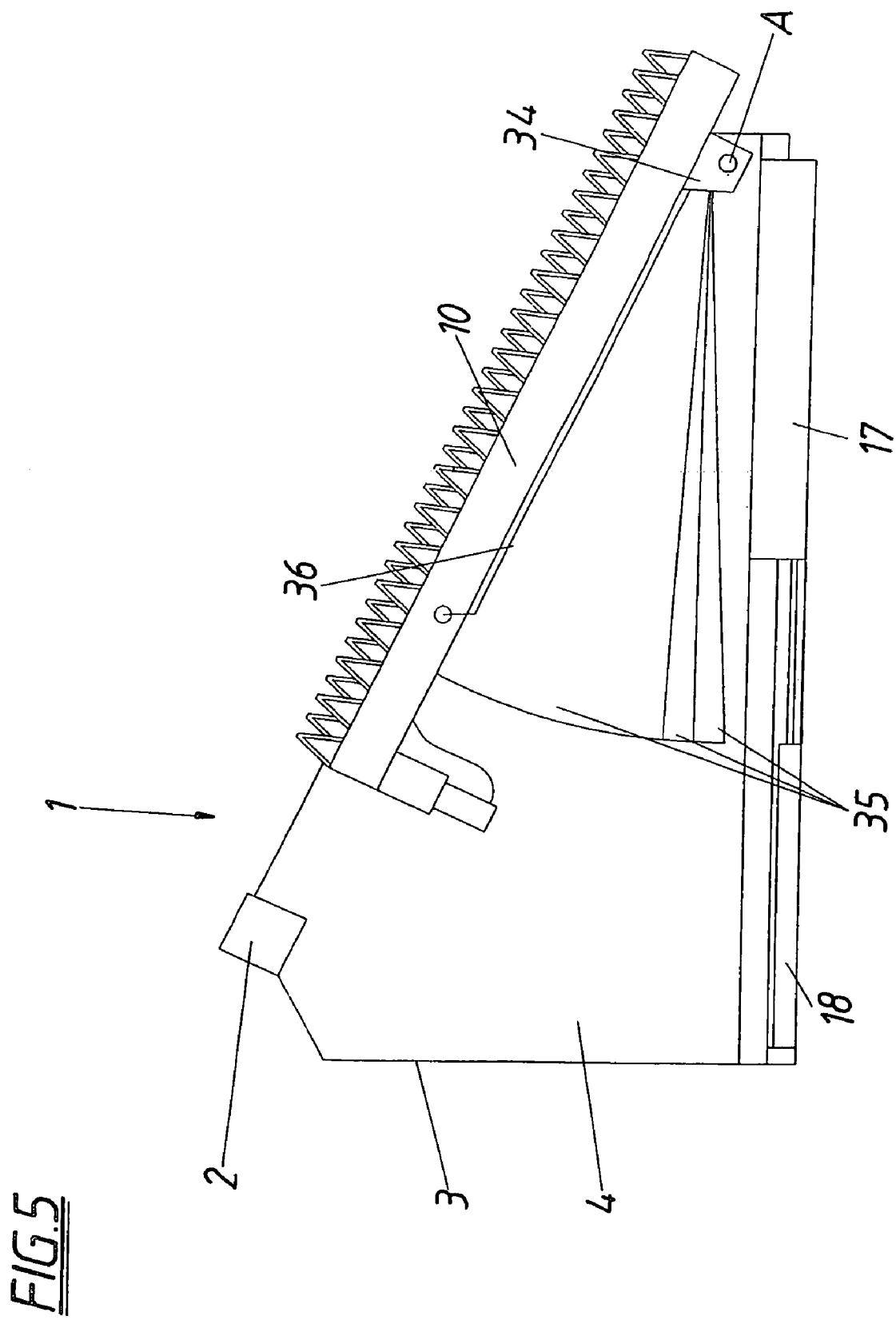

For the purpose of providing the cutter mechanism 1 with side cutters, connecting points 34 are provided on the intake end 33 of the side walls 4 in the region of the lower edge in which the side cutters 10 are held in a pivot-adjustable manner about an axis A which is parallel to the cutter bar and are in connection with the side walls 4 by means of intermediate plates 35 which are arranged in a fan-like manner and are supported in a pivoting way coaxially to the side cutter 10, with the upwardly pivoted side cutters 10 being supportable in a rigid and secure way by means of a securing bar 36 relative to the side walls 4. The side cutters 10 can be brought effortlessly from an idle position (FIG. 5) to a cutting position (FIGS. 3 and 4) and can be made to operate within the shortest possible time. For the purpose of achieving a favorable flow of the reaped material after the cutting by the side cutters 10, the side walls 4 are each equipped in the transitional region between the rear and front floor part with wall sections 37 facing inwardly by approximately 45°.

The gear 38 of the cutter mechanism driver is mounted rigidly on the front floor part 17. The V-belt 39 runs over the drive wheel 40 to the spring tension roll 41, with drive wheel 40 and spring tension roll 41 being rigidly held on a side wall 4. The V-belt 39 is then guided to the gear 38 via a tension roller 42 which is rigidly supported on the front floor part 17, so that any adjustment of the floor 5 and the resulting different spaces between gear 38 and the drive wheel 40 can be compensated with ease.

As indicated in the embodiment according to FIGS. 6 and 7, the floor 5 of the cutter mechanism trough 6 can also be provided with a louver-like configuration in order to cover the adjusting range of the cutting table. For this purpose the front floor part 17 comprises at least two mutually overlapping floor sections 43, 44 which are guided by means of telescopic guide tubes 45 against each other and slide-adjustable relative to the rear floor part 16.

The invention claimed is:

1. A cutter mechanism for a combine-harvester comprising a frame forming a trough having a rear wall, two side walls and a floor serving as a cutting table, the frame receiving an adjustably inserted cutter bar on an input side of the trough, connecting points for outer dividers, side cutters in end regions of the cutter bar, a reel displaceable by actuating drives above the cutter bar, and a feed screw situated within the trough upstream of a pass-through opening in the rear wall, the floor being transversely divided into a rear floor part fixed to the frame and a front floor part, for the purpose of adjusting the cutting table length to prevailing reaping conditions, the front floor part being guided in a slide-adjustable manner relative to the frame in a direction of travel, the floor parts overlapping each other along a path of displacement, wherein the front floor part is insertable underneath the rear floor part when shortening the cutting table, and a stripper projects from a front edge of the rear floor part and provides a transition between the two floor parts, or the front floor part comprises at least two overlapping floor sections slide-adjustably guided with respect to each other by telescopic guide tubes relative to the rear floor part, each one of the side walls forms an upper guide edge parallel to the floor in an adjusting region of the front floor part and displaceable along control cams connected to the front floor part, and a control roll for adjusting the position of the reel cooperates with said control cams, the control roll being arranged on a pivoting arm bearing the reel.

2. A cutter mechanism for a combine-harvester comprising a frame forming a trough having a rear wall, two side walls and a floor serving as a cutting table, the frame receiving an adjustably inserted cutter bar on an input side of the trough, connecting points for outer dividers, side cutters in end regions of the cutter bar, a reel displaceable by actuating drives above the cutter bar, and a feed screw situated within the trough upstream of a pass-through opening in the rear wall, the floor being transversely divided into a rear floor part fixed to the frame and a front floor part, for the purpose of adjusting the cutting table length to prevailing reaping conditions, the front floor part being guided in a slide-adjustable manner relative to the frame in a direction of travel, the floor parts overlapping each other along a path of displacement, wherein the front floor part is insertable underneath the rear floor part when shortening the cutting table, and a stripper projects from a front edge of the rear floor part and provides a transition between the two floor parts, or the front floor part comprises at least two overlapping floor sections slide-adjustably guided with respect to each other by telescopic guide tubes relative to the rear floor part, the side cutters are connected to an intake end of the side walls in the region of a lower edge thereof, the side cutters being upwardly pivotable about an axis parallel to the cutter bar and being connected to the side walls by means of intermediate plates which are arranged in a fan-like manner and are pivotally supported coaxially to the side cutters, the upwardly pivoted side cutters being supportable by means of a securing bar relative to the side walls.

* * * * *